(12) United States Patent
Takarabe et al.

(10) Patent No.: US 10,514,059 B2
(45) Date of Patent: Dec. 24, 2019

(54) BEARING DEVICE

(71) Applicant: JTEKT CORPORATION, Osaka-shi, Osaka (JP)

(72) Inventors: Masatsugu Takarabe, Kashiwara (JP); Yoshiyuki Ina, Osaka (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/768,990

(22) PCT Filed: Nov. 10, 2016

(86) PCT No.: PCT/JP2016/083312
§ 371 (c)(1),
(2) Date: Apr. 17, 2018

(87) PCT Pub. No.: WO2017/082327
PCT Pub. Date: May 18, 2017

(65) Prior Publication Data
US 2018/0298943 A1    Oct. 18, 2018

(30) Foreign Application Priority Data

Nov. 11, 2015 (JP) .................... 2015-221125

(51) Int. Cl.
*F16C 33/36* (2006.01)
*F16C 33/60* (2006.01)
(Continued)

(52) U.S. Cl.
CPC ............ *F16C 19/38* (2013.01); *F16C 19/543* (2013.01); *F16C 33/586* (2013.01); *F16C 43/04* (2013.01)

(58) Field of Classification Search
CPC ....... F16C 33/60; F16C 43/04; F16C 2226/74
See application file for complete search history.

(56) References Cited

U.S. PATENT DOCUMENTS 4,783,182 A * 11/1988 Caron .................. F16C 19/183
                                                        384/504
5,096,310 A *  3/1992 Meining ................ F16C 19/28
                                                        384/506
(Continued)

FOREIGN PATENT DOCUMENTS

CN        201448356 U     5/2010
JP        S62-158216 U   10/1987
(Continued)

OTHER PUBLICATIONS

Jan. 24, 2017 Search Report issued in International Patent Application No. PCT/JP2016/083312.
(Continued)

*Primary Examiner* — Phillip A Johnson
(74) *Attorney, Agent, or Firm* — Oliff PLC (57) ABSTRACT

A bearing device includes: a first outer ring member and a second outer ring member which include a raceway surface in each inner circumferential surface and are disposed to abut on each other in an axial direction; a connection ring which fixes the first outer ring member and the second outer ring member to each other; an inner ring in which two rows of raceway surfaces are formed in an outer circumferential surface; and a plurality of rolling elements which are disposed in a space formed between the raceway surface of the first outer ring member and one of the two rows of the raceway surfaces of the inner ring, and in a space formed between the raceway surface of the second outer ring member and the other one of the two rows of the raceway surfaces of the inner ring.

2 Claims, 11 Drawing Sheets

(51) Int. Cl.
*F16C 19/38* (2006.01)
*F16C 43/04* (2006.01)
*F16C 19/54* (2006.01)
*F16C 33/58* (2006.01)

(56) References Cited

U.S. PATENT DOCUMENTS

| | | | | | |
|---|---|---|---|---|---|
| 5,470,165 | A | * | 11/1995 | Bissinger | F16C 33/60 384/499 |
| 5,641,239 | A | * | 6/1997 | Michalek | F16C 33/60 384/499 |
| 5,651,617 | A | * | 7/1997 | Danielsson | B60B 27/001 384/539 |
| 5,740,165 | A | * | 4/1998 | Vannucci | H04W 52/24 370/330 |
| 9,441,673 | B2 | * | 9/2016 | Katsaros | F16C 33/6648 |

| | | | |
|---|---|---|---|
| 2007/0177839 | A1 | 8/2007 | Van De Sanden et al. |

FOREIGN PATENT DOCUMENTS

| | | | | | |
|---|---|---|---|---|---|
| JP | H03-026828 | U | | 3/1991 | |
| JP | 2001-140868 | A | | 5/2001 | |
| JP | 2004360723 | A | * | 12/2004 | ............ F16C 19/184 |
| JP | 2006-312955 | A | | 11/2006 | |
| JP | 2006312955 | A | * | 11/2006 | ............ F16C 19/183 |
| JP | 2006-528327 | A | | 12/2006 | |
| JP | 2008075832 | A | * | 4/2008 | .............. F16C 43/04 |
| JP | 2011-027130 | A | | 2/2011 | |

OTHER PUBLICATIONS

May 17, 2019 Office Action issued in Chinese Patent Application No. 201680062311.8.

* cited by examiner

BEARING DEVICE

TECHNICAL FIELD

Embodiments of the present invention relate to a bearing device, and particularly to a bearing device which is used in a wheel of a vehicle such as a truck.

BACKGROUND ART

A taper hub unit is used in a vehicle having a vehicle body of a frame structure such as a truck (for example, Patent Literature 1 (JP-A-2011-27130)).

The bearing device disclosed in Patent Literature 1 includes an outer ring, an inner ring, a plurality of roller rolling elements, and a retainer. The outer ring and the inner ring have two rows of raceway surfaces. The roller rolling elements are disposed in two rows in order to roll in two rows of raceway surfaces (the outer ring and the inner ring). The retainer holds the plurality of roller rolling elements in a space interposed between the raceway surface of the outer ring and the raceway surface of the inner ring.

By the way, an outer ring in a bearing device having a plurality of bearing rings has been formed by a plurality of members.

Patent Literature 2 (JP-A-2006-312955) discloses a bearing device in which the rolling elements are disposed in two rows. In the bearing device, an outer ring is formed of a pair of outer ring members having a single row of grooves. The pair of outer ring members are fixed not to be separated using an annular resin connection ring.

In the bearing device disclosed in Patent Literature 2, making an explanation on the pair of outer ring members and the connection ring in detail, an annular groove is provided in a portion near the other outer ring member in an outer circumferential surface in each of the pair of outer ring members. On the other hand, in the connection ring, an annular claw is formed to protrude toward in a direction of the axis in an inner circumferential surface. The connection ring is formed with two rows of annular claws. In other words, the connection ring is formed such that a cross section passing through an axial center is a U shape. The two rows of annular claws are formed such that the annular grooves formed in each of the pair of outer ring members are engaged. With this configuration, the pair of outer ring members are fixed by the connection ring not to be separated.

PRIOR ART DOCUMENTS

Patent Literature

[Patent Literature 1]: JP-A-2011-27130
[Patent Literature 2]: JP-A-2006-312955

SUMMARY OF THE INVENTION

Technical Problem

However, the annular claws are provided on the entire periphery of the connection ring in the bearing device disclosed in Patent Literature 2. Therefore, a significantly large pressing force is necessary when the connection ring is pressed and mounted in the pair of outer ring members. At this time, a significant stress is applied on the connection ring. Therefore, a working process of fixing the pair of outer ring members using the connection ring of Patent Literature 2 is hard.

The invention has been made in view of the problems, and an object of the invention is to provide a bearing device which includes an outer ring formed of a plurality of members and is able to easily fix the members of the outer ring.

Solution to Problem

In a first aspect of the invention, a bearing device includes: a first outer ring member and a second outer ring member which include a raceway surface in each inner circumferential surface and are disposed to abut on each other in an axial direction; a connection ring which fixes the first outer ring member and the second outer ring member to each other; an inner ring in which two rows of raceway surfaces are formed in an outer circumferential surface; and a plurality of rolling elements which are disposed in a space formed between the raceway surface of the first outer ring member and one of the two rows of the raceway surfaces of the inner ring, and in a space formed between the raceway surface of the second outer ring member and the other one of the two rows of the raceway surfaces of the inner ring. The first outer ring member includes a first groove extending in a circumferential direction in an outer circumferential surface, the second outer ring member includes a second groove extending in a circumferential direction in an outer circumferential surface, the connection ring includes a plurality of first claws which extrude toward the first groove and are disposed to be separated from each other in the circumferential direction, and a plurality of second claws which extrude toward the second groove and are disposed to be separated from each other in the circumferential direction, and the plurality of first claws are engaged with the first groove, and the plurality of second claws are engaged with the second groove, so that the first outer ring member and the second outer ring member are fixed to each other.

Advantageous Effects of the Invention

According to the first aspect, the plurality of first claws and the plurality of second claws are formed in the inner circumferential surface of the connection ring. Each of the plurality of first claws and each of the plurality of second claws are formed to be separated from each other in the circumferential direction. Therefore, it is possible to easily fix the first outer ring member and the second outer ring member with the connection ring without needing a large pressing force.

DESCRIPTION OF EMBODIMENTS

A bearing device of the invention includes a first outer ring member and a second outer ring member which include a raceway surface in each inner circumferential surface and are disposed to abut on each other in an axial direction, a connection ring which fixes the first outer ring member and the second outer ring member to each other, an inner ring which is formed with two rows of raceway surfaces in an outer circumferential surface, and a plurality of rolling elements which are disposed in a space formed between the raceway surface of the first outer ring member and one of the two rows of the raceway surfaces of the inner ring and a space formed between the raceway surface of the second outer ring member and the other one of the two rows of the raceway surfaces. The first outer ring member includes a first groove in an outer circumferential surface. The first groove extends in a circumferential direction. The second outer ring member includes a second groove in an outer circumferential surface. The second groove extends in the circumferential direction. The connection ring includes a plurality of first claws which extrude toward the first groove and are disposed to be separated from each other in the circumferential direction, and a plurality of second claws which extrude toward the second groove and are disposed to be separated from each other in the circumferential direction. The plurality of first claws is engaged with the first groove, and the plurality of second claws is engaged with the second groove, so that the first outer ring member and the second outer ring member are fixed to each other.

According to this configuration, the plurality of first claws and the plurality of second claws are formed in the inner circumferential surface of the connection ring. Each of the plurality of first claws and each of the plurality of second claws are formed to be separated from each other in the circumferential direction. Therefore, it is possible to easily fix the first outer ring member and the second outer ring member with the connection ring without needing a large pressing force.

In the connection ring of the bearing device of the invention, the first claws and the second claws are desirably disposed not to be overlapped when viewed from the axial direction.

According to this configuration, there is used two molds which are separable in the axial direction. With the two molds, the connection ring may be manufactured using a method such as an injection molding. Therefore, a manufacturing process of the connection ring becomes easy to be implemented.

In the bearing device of the invention, the plurality of first claws and the plurality of second claws each are desirably formed by three or more.

According to this configuration, the first outer ring member and the second outer ring member can be securely fixed by the connection ring.

Hereinafter, preferred embodiments of the invention will be described in detail with reference to the drawings. In the respective drawings referred in the following description, only main members necessary for describing the invention will be simplified for the convenience of explanation. Therefore, the invention may include arbitrary components which are not illustrated in the following drawings. Dimensions of the members in the following drawings are not exactly the same as those the actual members, and a ratio of the dimensions of the respective members may be different.

Hereinafter, embodiments of the invention will be described on the basis of the drawings.

Figure 1:
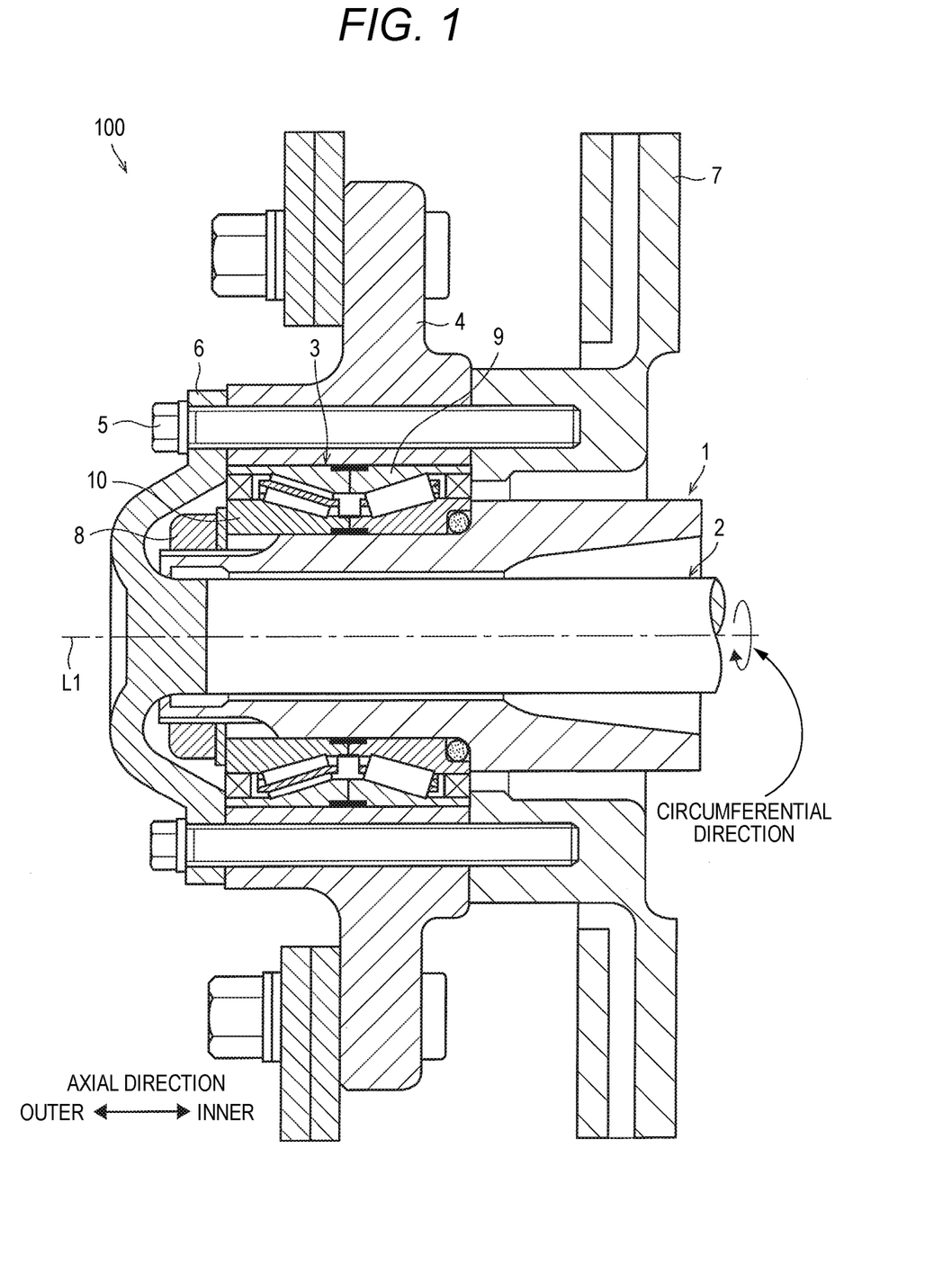
FIG. 1 is a cross-sectional view of a hub unit.

FIG. 1 illustrates a hub unit 100 according to this embodiment. FIG. 1 is a cross-sectional view taken along an axial center L1 of the hub unit 100. The hub unit 100 is used in, for example, a wheel of a vehicle such as a truck.

The hub unit 100 includes an axle pipe 1, a driving shaft 2, a tapered roller bearing 3, a wheel hub 4, a hub bolt 5, a flange 6, a brake rotor 7, and a fixing nut 8. The axle pipe 1 is connected to a differential (not illustrated). The driving shaft 2 is inserted in the axle pipe 1. The tapered roller bearing 3 is mounted in an outer circumferential surface of the axle pipe 1. The tapered roller bearing 3 is a bearing where rolling elements are disposed in double rows (two rows in this embodiment). The tapered roller bearing 3 of this embodiment corresponds to the bearing device of the invention.

The wheel hub 4 is fitted to an outer circumferential surface of the tapered roller bearing 3. With this configuration, the wheel hub 4 becomes rotatable to the axle pipe 1. The wheel hub 4 is connected to the flange 6 of the driving shaft 2 through the hub bolt 5. The hub bolt 5 connects the flange 6, the wheel hub 4, and the brake rotor 7.

As described above, the tapered roller bearing 3 is fitted to the inner circumferential surface of the wheel hub 4, and fitted to the outer circumferential surface of the end on the outer side of the axle pipe 1. In other words, an outer ring 9 (described below) of the tapered roller bearing 3 rotates integrally to the wheel hub 4. An inner ring 10 of the tapered roller bearing 3 rotates integrally to the axle pipe 1. The tapered roller bearing 3 is fastened and fixed by the fixing nut 8 not to be loosed in the axial direction.

Figure 2:
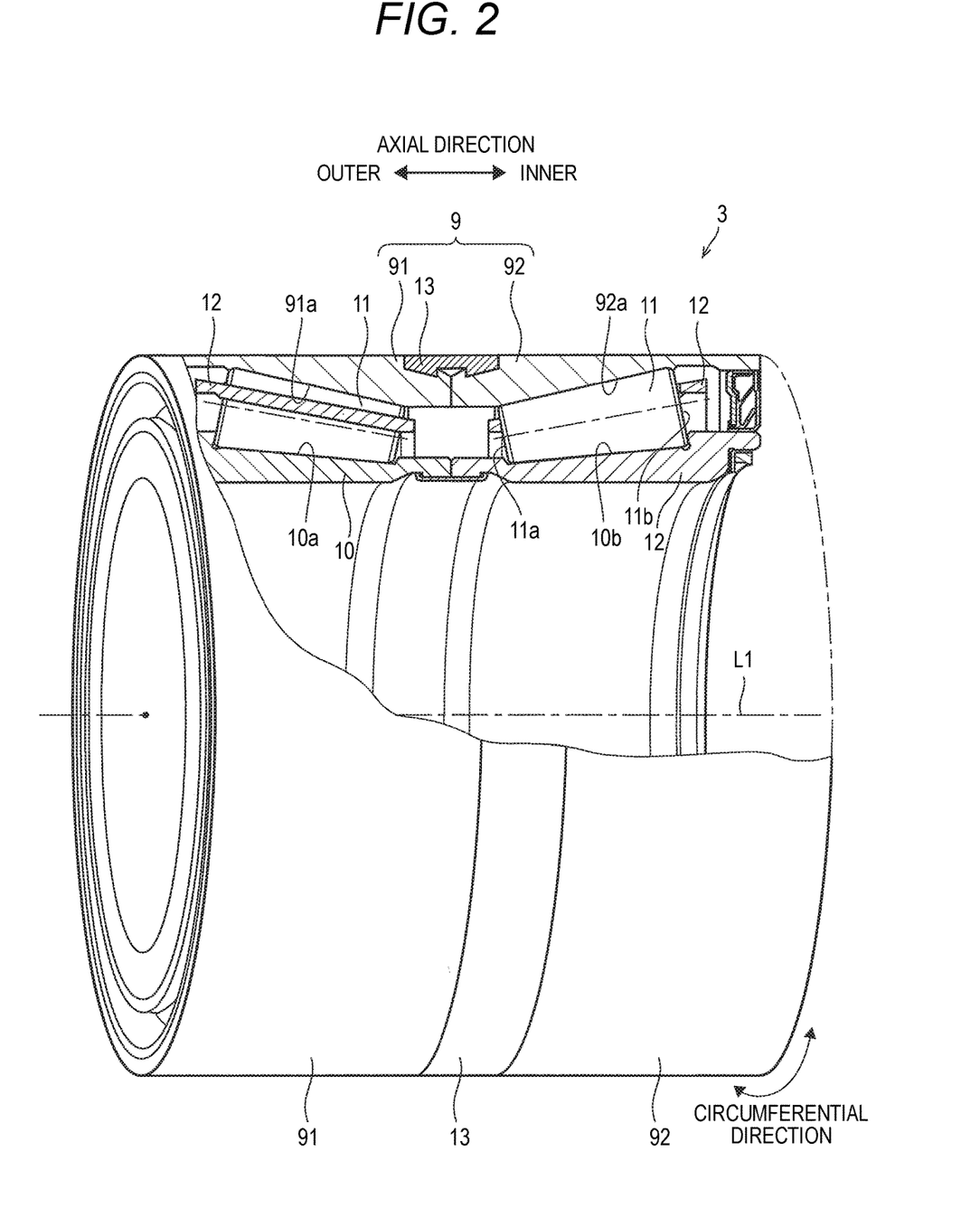
FIG. 2 is a perspective view partially illustrating a cross section in a tapered roller bearing.

FIG. 2 is a perspective view of the tapered roller bearing 3. In the perspective view of FIG. 2, a cross section taken along the plane containing the axial center L1 is illustrated. The tapered roller bearing 3 includes a pair of outer rings 9, the inner ring 10, a plurality of rolling elements 11, and a retainer 12.

The outer ring 9 is formed of a pair of outer ring members. The pair of outer ring members will be called a first outer ring member 91 and a second outer ring member 92 respectively. Each of the first outer ring member 91 and the second outer ring member 92 is formed almost in a cylindrical shape. The first outer ring member 91 and the second outer ring member 92 have the same inner diameter and the same outer diameter. One bottom of the first outer ring member 91 and one bottom of the second outer ring member 92 are fixed to each other, and form the outer ring 9 of almost the cylindrical shape as a whole. A fixing configuration of the first outer ring member 91 and the second outer ring member 92 will be described below.

A raceway surface is formed in the inner circumferential surface of the pair of the first outer ring member 91 and the second outer ring member 92. The rolling element 11 rolls on the raceway surface. The raceway surface formed in the first outer ring member 91 is called a first raceway surface 91a, and the raceway surface formed in the second outer ring member 92 is called a second raceway surface 92a.

A portion near the second raceway surface 92a in the axial direction in the first raceway surface 91a is formed to have a large diameter from the axial center L1 compared to a portion away from the second raceway surface 92a in the axial direction in the first raceway surface 91a. Similarly, a portion near the first raceway surface 91a in the axial direction in the second raceway surface 92a is formed to have a large diameter from the axial center L1 compared to a portion away from the first raceway surface 91a in the axial direction in the second raceway surface 92a. With this configuration, over the entire outer ring 91, thicknesses in the radial direction at both ends in the axial direction each are formed thinner than that in the radial direction in the center portion in the axial direction. In a cross section containing the axial center L1, the first raceway surface 91a is inclined in a straight shape from the center portion in the axial direction of the outer ring 9 toward the end. The second raceway surface 92a is inclined in a straight shape from the center portion in the axial direction of the outer ring 9 toward the end.

The inner ring 10 is disposed to be fitted into the outer ring 9. Two rows of raceway surfaces are formed in an outer circumferential surface of the inner ring 10 to be separated from each other in the axial direction. The two rows of raceway surfaces formed in the outer circumferential surface of the inner ring 10 are called a first raceway surface 10a and a second raceway surface 10b. The first raceway surface 10a and the second raceway surface 10b are formed to correspond to the first raceway surface 91a and the second raceway surface 92a of the outer ring 9 respectively. The inner ring 10 may be formed of a pair of inner ring members as illustrated in FIG. 2, or may be formed of a single member.

A portion near the second raceway surface 10b in the axial direction in the first raceway surface 10a is formed to have a large diameter from the axial center L1 compared to a portion away from the second raceway surface 10b in the axial direction in the first raceway surface 10a. Similarly, a portion near the first raceway surface 10a in the axial direction in the second raceway surface 10b is formed to have a large diameter from the axial center L1 compared to a portion away from the first raceway surface 10a in the axial direction in the second raceway surface 10b. With this configuration, over the entire inner ring 10, thicknesses in the radial direction at both ends in the axial direction are formed thicker than that in the radial direction in the center portion in the axial direction. In a cross section containing the axial center L1, the first raceway surface 10a is inclined in a straight shape from the center portion in the axial direction of the inner ring 10 toward the end. The second raceway surface 10b is inclined in a straight shape from the center portion in the axial direction of the inner ring 10 toward the end.

The inclination angle of the first raceway surface 10a of the inner ring is smaller than that of the first raceway surface 91a of the outer ring. The inclination angle of the second raceway surface 10b of the inner ring is smaller than that of the second raceway surface 92a of the outer ring. With this configuration, the space (raceway) formed between the first raceway surfaces 91a and 10a and the space (raceway) formed between the second raceway surfaces 92a and 10b in the space formed between the outer ring 9 and the inner ring 10 are formed to be large in the radial direction from the center portion in the axial direction toward both ends.

Each of the plurality of rolling elements 11 is a tapered roller rolling element. Each of the plurality of rolling elements 11 is a truncated corn shape which has a small-diameter bottom 11a and a large-diameter bottom 11b. The plurality of rolling elements 11 are disposed in a space (raceway) formed between the inner circumferential surface of the outer ring 9 and the outer circumferential surface of the inner ring 10. Specifically, one disposed on the outer side among the plurality of rolling elements 11 is disposed between the first raceway surface 91a of the outer ring 9 and the first raceway surface 10a of the inner ring, and come into contact with the first raceway surface 91a and the first raceway surface 10a. One disposed on the inner side among the plurality of rolling elements 11 is disposed between the second raceway surface 92a of the outer ring 9 and the second raceway surface 10b of the inner ring, and comes into contact with the second raceway surface 92a and the second raceway surface 10b. The rolling element 11 disposed between the first raceway surface 91a and the first raceway surface 10a is disposed such that the small-diameter bottom 11a of the rolling element 11 is disposed in the portion near the center in the axial direction in the first raceway surfaces 91a and 10a. The rolling element 11 disposed between the second raceway surface 92a and the second raceway surface 10b is disposed such that the small-diameter bottom 11a of the rolling element 11 is disposed in the portion near the center in the axial direction in the second raceway surfaces 92a and 10b.

The retainer 12 is disposed in a space formed of the inner circumferential surface of the outer ring 9 and the outer circumferential surface of the inner ring 10. The retainer 12 holds the plurality of rolling elements 11 such that the plurality of rolling elements 11 are disposed as described above.

The first outer ring member 91 and the second outer ring member 92 are fixed to each other to form the outer ring 9 as described above. The first outer ring member 91 and the second outer ring member 92 are connected by a connection ring 13. The connection ring 13 connects the first outer ring member 91 and the second outer ring member 92 in the outer circumferential surfaces of both members as illustrated in FIG. 2.

Figure 3:
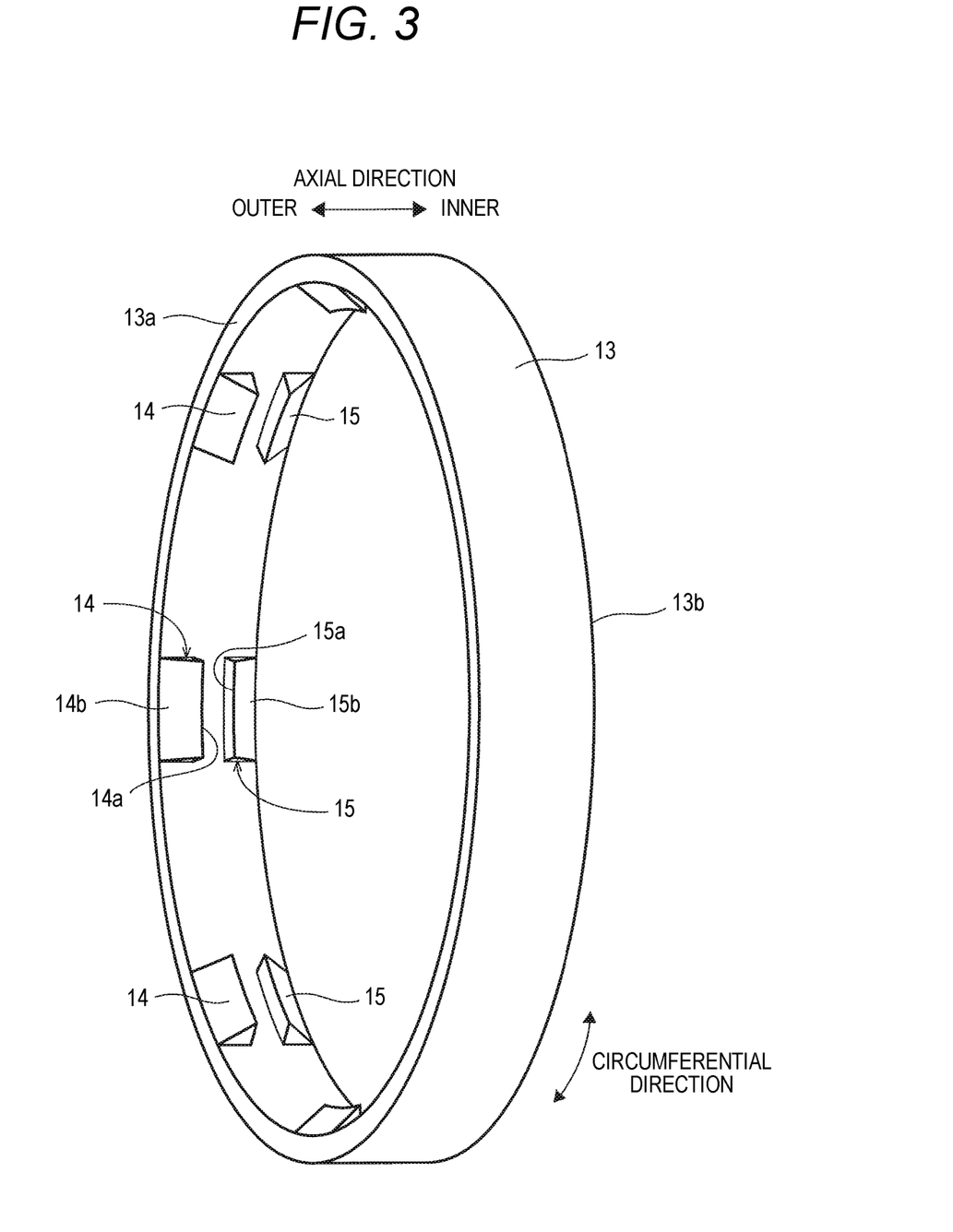
FIG. 3 is a perspective view of a connection ring of a first embodiment.
Figure 4:
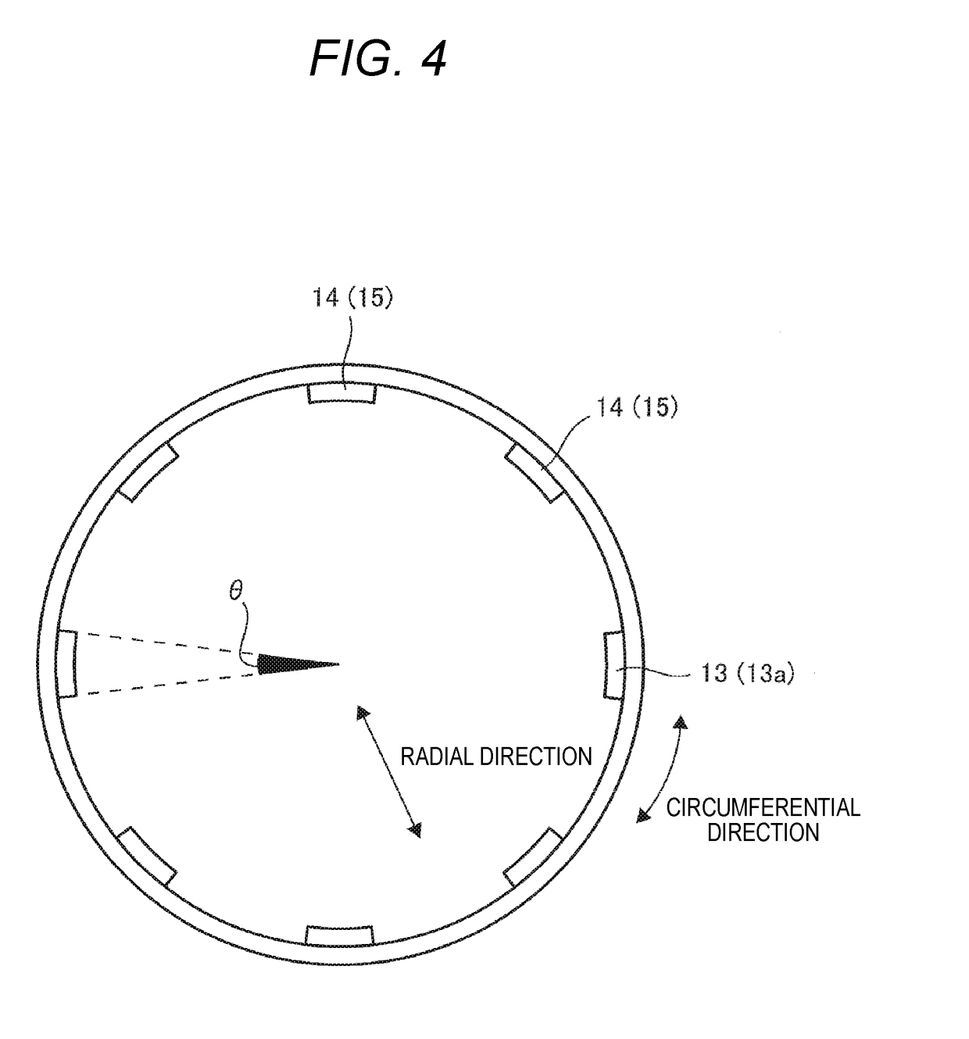
FIG. 4 is a top view of the connection ring of the first embodiment when viewed from an axial direction.

FIG. 3 is a perspective view of the connection ring 13. FIG. 4 is a top view of the connection ring 13 when viewed from the axial direction. The connection ring 13 is configured in an endless annular shape. A plurality of claws 14 and 15 are formed in the inner circumferential surface of the connection ring 13. The plurality of claws 14 are disposed along one end surface 13a in the axial direction of the connection ring 13. The plurality of claws 15 are disposed along the other end surface 13b in the axial direction of the connection ring 13. The plurality of claws 14 are formed to be separated from each other in the circumferential direction. The plurality of claws 15 are formed to be separated from each other in the circumferential direction.

Each of the plurality of claws 14 and 15 extrudes in the direction of the axis from the inner circumferential surface of the connection ring 13. Each of the plurality of claws 14 and 15 is formed integrally to the connection ring 13.

A surface 14a near the center portion in the axial direction of the claw 14 is formed almost in parallel to the radial direction of the connection ring 13. The surface 14a is formed to be engaged with the first outer ring member 91. A surface 14b near the end in the axial direction of the claw 14 is formed to connect the side near the axial center in the surface 14a and the end surface 13a of the connection ring 13. In other words, the surface 14b is inclined to the radial direction of the connection ring 13.

A surface 15a near the center portion in the axial direction of the claw 15 is formed almost in parallel to the radial direction of the connection ring 13. The surface 15a is formed to be engaged with the second outer ring member 92. A surface 15b near the end in the axial direction of the claw 15 is formed to connect the side near the axial center in the surface 15a and the end surface 13b of the connection ring 13. In other words, the surface 15b is inclined to the radial direction of the connection ring 13.

The claw 14 is desirably formed by three or more in the connection ring 13. In a case where the number of claws 14 is two or less, there is a concern that stability between the connection ring 13 and the first outer ring member 91 is degraded. While a maximum number of claws 14 is not limited, the number of claws 14 is, for example, 3 to 10. The claw 15 is desirably formed by three or more in the connection ring 13. In a case where the number of claws 15 is two or less, there is a concern that the stability between the connection ring 13 and the second outer ring member 92 is degraded. While a maximum number of claws 15 is not limited, the number of claws 15 is, for example, 3 to 10. The number of claws 14 and the number of claws 15 are desirably the same.

The plurality of claws 14 and 15 are desirably formed in the same dimension from the viewpoint of a balanced stability of the entire tapered roller bearing 3. The plurality of claws 14 and 15 are desirably disposed to be separated at an equal interval from the viewpoint of a balanced stability of the entire tapered roller bearing 3.

As illustrated in FIG. 4, an angle formed between the both ends in the circumferential direction of the claw 14 and the center in the radial direction of the connection ring 13 is set to θ. At that time, as shown in Expression (1), a total sum of magnitudes (°) of the angles θ of the claws 14 is desirably 5% or more with respect to the entire periphery (360°). With this configuration, the stability in attaching the connection ring 13 to the first outer ring member 91 is improved. In Expression (1), "n" indicates the number of claws 14.

[Math. 1]

$$\sum_{k=1}^{n} \theta_k / 360° \geq 0.05 \quad (1)$$

Similarly, when an angle formed between the both ends in the circumferential direction of the claw 15 and the center in the radial direction of the connection ring 13 is set to θ, a total sum of magnitudes (°) of the angles θ of the claws 15 is desirably 5% or more with respect to the entire periphery (360°).

The plurality of claws 14 and the plurality of claws 15 are disposed in pairs to face each other in the axial direction as illustrated in FIG. 3.

The connection ring 13 is made of a resin. As a resin for forming the connection ring 13, for example, PA66 (6,6-nylon) and PA46 (4,6-nylon) may be used.

In a case where the connection ring 13 is formed by an injection molding using a normal mold, a resin is injected even between the claw 14 and the claw 15 in the circumferential direction of the connection ring 13. In that case, the claw 14 and the claw 15 are formed by removing the resin between the claw 14 and claw 15 by an additional process after the resin is injected and molded.

On the other hand, a slide mold may be used during the injection molding. In a case where the connection ring 13 is formed by the injection molding using the slide mold, the claw 14 and the mold are engaged in the axial direction and the claw 15 and the mold are engaged in the axial direction after the resin is injected and molded. In that case, since the slide mold is moved in the radial direction after the resin is injected and molded, the engagement between the claw 14 and the mold are released, and at the same time the slide mold can be separated from the connection ring 13 by releasing the engagement between the claw 15 and the mold. In a case where the slide mold is used, the resin is not injected between the claw 14 and the claw 15 in the injection molding. Therefore, there is no need to perform an additional process for removing an unnecessary resin.

Figure 5:
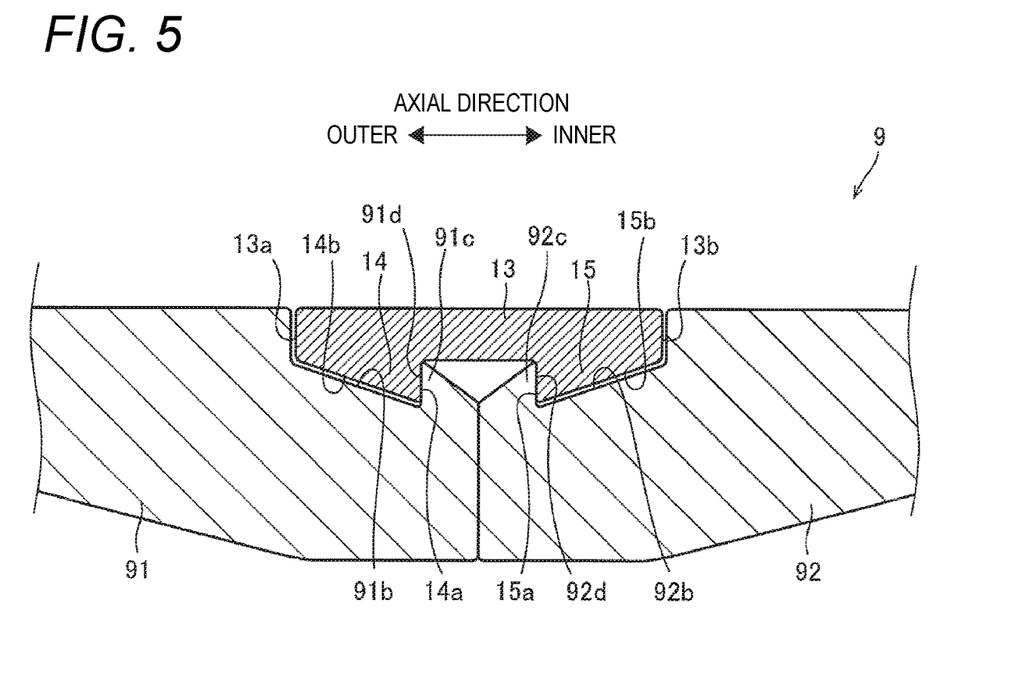
FIG. 5 is a cross-sectional view illustrating part of an outer ring and the connection ring of the first embodiment.
Figure 6:
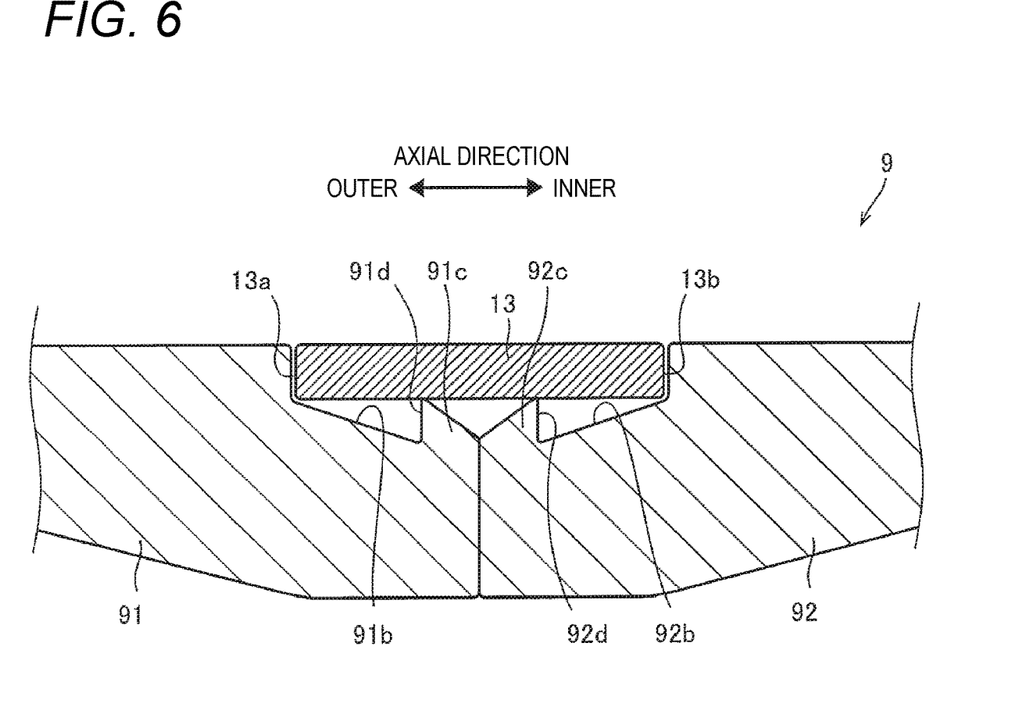
FIG. 6 is a cross-sectional view illustrating part of the outer ring and the connection ring of the first embodiment.

FIGS. 5 and 6 are enlarged cross-sectional views illustrating the vicinity of the connection ring 13 in the outer ring 9. FIG. 5 is a cross-sectional view of a surface which passes through the claw 14 in the connection ring 13 and contains the axial center L1 (not illustrated in FIG. 5) of the outer ring 9. FIG. 6 is a cross-sectional view which does not pass through the claw 14 in the connection ring 13 and contains the axial center L1 (not illustrated in FIG. 6) of the outer ring 9.

As illustrated in FIGS. 5 and 6, in the outer circumferential surface of the first outer ring member 91, there is formed an annular groove 91b in the circumferential direction near the portion abutting on the second outer ring member 92. In the outer circumferential surface of the second outer ring member 92, there is formed an annular groove 92b in the circumferential direction near the portion abutting on the first outer ring member 91.

In the first outer ring member 91, a portion close the center in the axial direction from the groove 91b is called a convex portion 91c. Similarly, in the second outer ring member 92, a portion close to the center in the axial direction from the groove 92b is called a convex portion 92c. The convex portions 91c and 92c extend in an annular shape in the circumferential direction along the first outer ring member 91 and the second outer ring member 92 respectively.

A surface 91d facing in a direction opposite the second outer ring member 92 in the convex portion 91c is almost in parallel to the radial direction of the outer ring 9. A surface 92d facing in a direction opposite the first outer ring member 91 in the convex portion 92c is almost in parallel to the radial direction of the outer ring 9.

In a state where the first outer ring member 91, the second outer ring member 92, and the connection ring 13 are fitted, the claw 14 is fitted to the groove 91b, and the claw 15 is fitted to the second outer ring member 92b in the portion of the claws 14 and 15 of the connection ring 13 as illustrated in FIG. 5. At this time, the connection ring 13 is attached such that the surface 14a of the claw 14 abuts on the surface 91d where the convex portion 91c of the first outer ring member 91 is formed, and the surface 15a of the claw 15 abuts on the surface 92d where the convex portion 92c of the second outer ring member 92 is formed. With this configuration, a relative movement between the first outer ring member 91 and the second outer ring member 92 in the axial direction is restricted.

On the other hand, in the portion where the claws 14 and 15 are not formed in the connection ring 13, there is nothing fitted to the grooves 91b and 92b as illustrated in FIG. 6.

The connection ring 13 can be pressed and attached to the first outer ring member 91 and the second outer ring member 92 from the outer circumferential surface. With this configuration, a relative movement between the first outer ring member 91 and the second outer ring member 92 in the axial direction is restricted.

(Effects of First Embodiment)

According to the tapered roller bearing 3 of this embodiment, since a plurality of the discontinuous claws 14 and 15 are formed in the inner circumferential surface of the connection ring 13, the connection ring 13 can be easily fitted to the first outer ring member 91 and the second outer ring member 92 without a large pressing force compared to a case where the claws are formed over all the periphery of the connection ring. In other words, it is possible to easily fix the first outer ring member 91 and the second outer ring member 92.

Since a large pressing force is not necessary when the connection ring 13 is fitted, a large stress is not applied to the resin of the connection ring 13. Therefore, it is prevented that the connection ring 13 is degraded or damaged by a large pressure on the connection ring 13 when the connection ring 13 is fitted.

Since the number of claws 14 and 15 formed in the connection ring 13 of this embodiment is 3 to 10, the first outer ring member 91 and the second outer ring member 92 can be stably fixed by the connection ring 13.

In the connection ring 13 of this embodiment, the plurality of claws 14 and 15 are formed in the same dimension. Since the claws are disposed at an equal interval in the circumferential direction, the first outer ring member 91 and the second outer ring member 92 can be stably fixed.

Further, when the angle formed between the both ends in the circumferential direction of the claws 14, 15 and the center in the radial direction of the connection ring is set to θ, a total sum of magnitudes (°) of the angles θ of the claws 14 and 15 is 5% or more with respect to the entire angle (360°). Therefore, the first outer ring member 91 and the second outer ring member 92 can be stably fixed.

<Second Embodiment>

Figure 7:
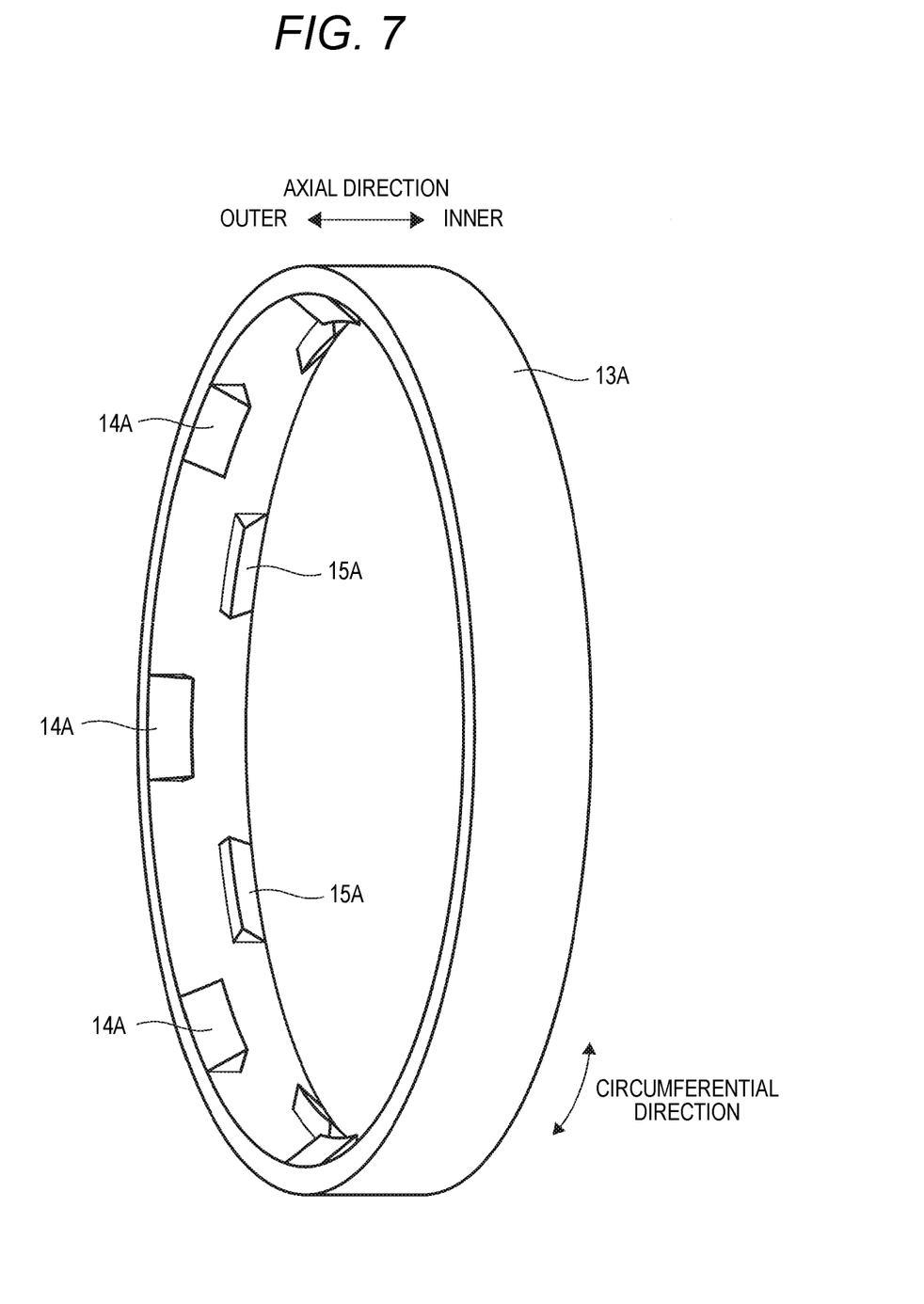
FIG. 7 is a perspective view of a connection ring of a second embodiment.

Next, a hub unit of a second embodiment will be described. The hub unit of this embodiment has the same configuration as that of the hub unit 100 of the first embodiment except that the structure of a connection ring 13A is different. Hereinafter, the description will be given about the structure of the connection ring 13A and the connection structure of the first outer ring member 91 and the second outer ring member 92.

Figure 8:
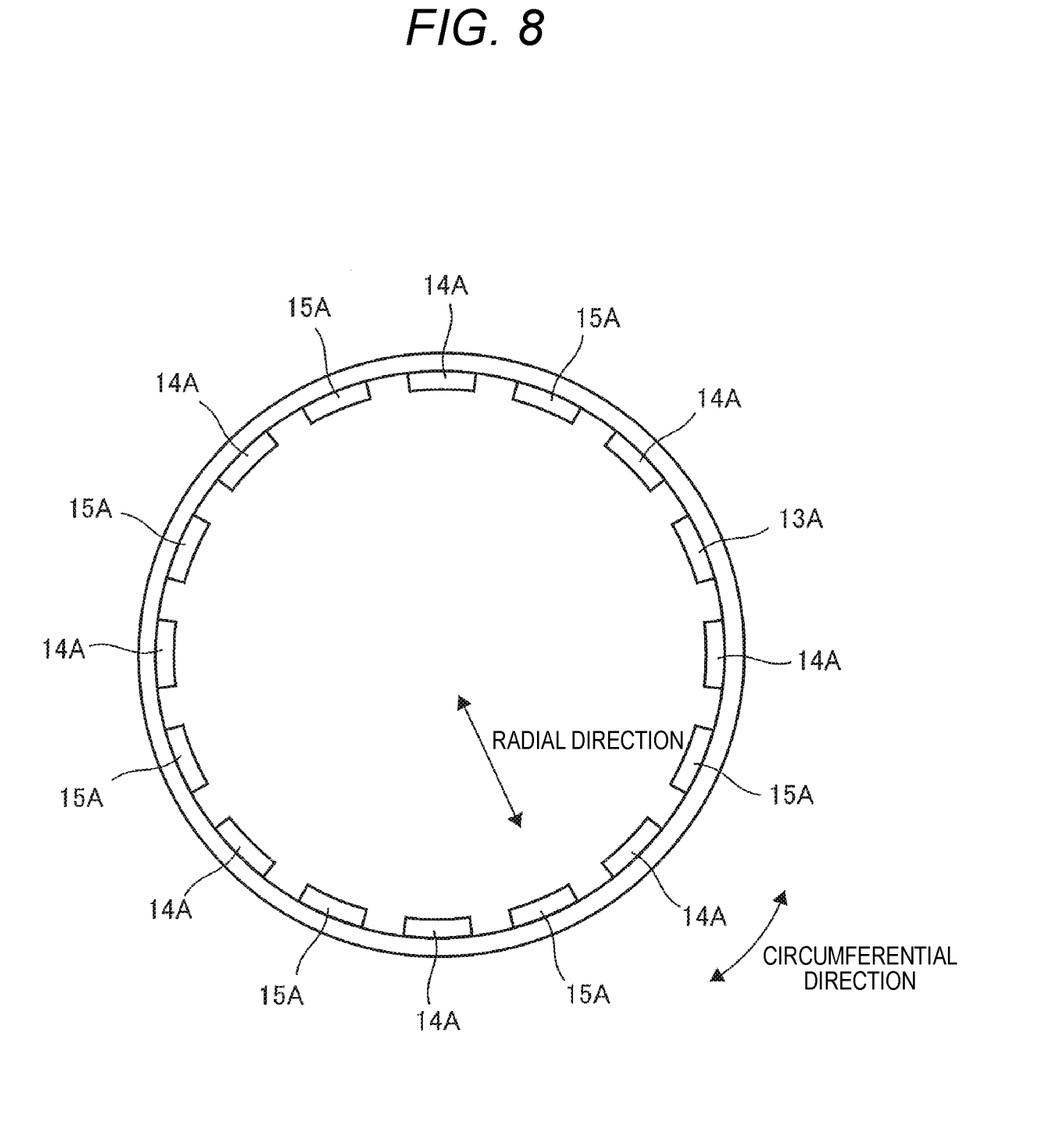
FIG. 8 is a top view of the connection ring of the second embodiment when viewed from the axial direction.

FIG. 7 is a perspective view of the connection ring 13A. FIG. 8 is a top view of the connection ring 13A when viewed from the axial direction. The connection ring 13A is formed in an endless annular shape. The inner circumferential surface of the connection ring 13A is formed with a plurality of claws 14A and 15A.

In the connection ring 13 of the first embodiment, the claw 14 along the end surface 13a and the claw 14 along the end surface 13b in the plurality of claws 14 are disposed in pairs to face each other in the axial direction. On the other hand, in the connection ring 13A of this embodiment, as illustrated in FIG. 8, the claw 14 along the end surface 13a and the claw 14A along the end surface 13b in the plurality of claws 14A are disposed not to be overlapped with each other when viewed from the radial direction.

The configurations of the plurality of claws 14A and 15A are the same as those of the claws 14 and 15 of the first embodiment.

(Manufacturing Method of Connection Ring)

Figure 9:
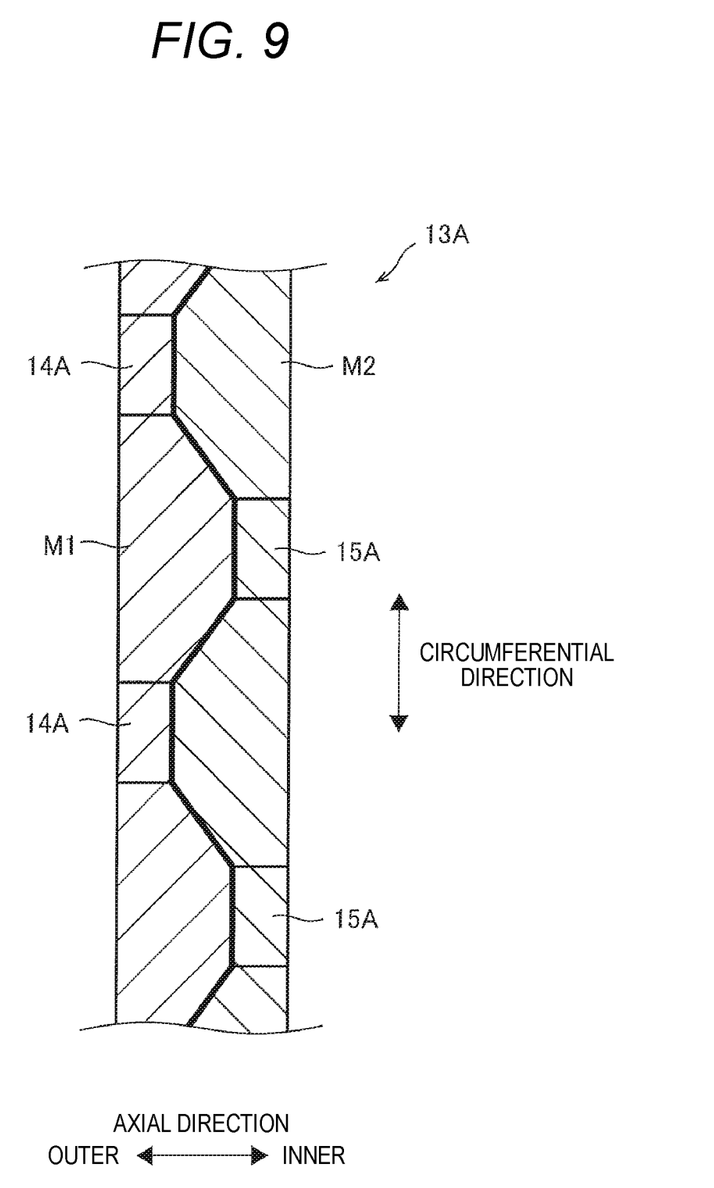
FIG. 9 is a diagram for describing a manufacturing method of the connection ring of the second embodiment.

The connection ring 13A can be formed by injecting a resin in a mold. FIG. 9 is a diagram for describing a manufacturing method of the connection ring 13A. In FIG. 9, the inner circumferential surface of the connection ring 13A is viewed from the axial center L1.

When the connection ring 13A is manufactured, two molds M1 and M2 are used. The mold M1 is a mold corresponding to the shape of part of the connection ring 13A and the claw 14A. The mold M2 is a mold corresponding to part of the connection ring 13A and the claw 15A. While the molds M1 and M2 are assembled, a resin flows in. The mold M1 is drew from a thick-lined portion of FIG. 9 to the left side in FIG. 9, and the mold M2 is drew to the right side so as to obtain the connection ring 13A. In FIG. 9, the region of the mold M1 and the region of mold M2 are hatched in order to make a distinction therebetween for convenience sake.

Figure 10:
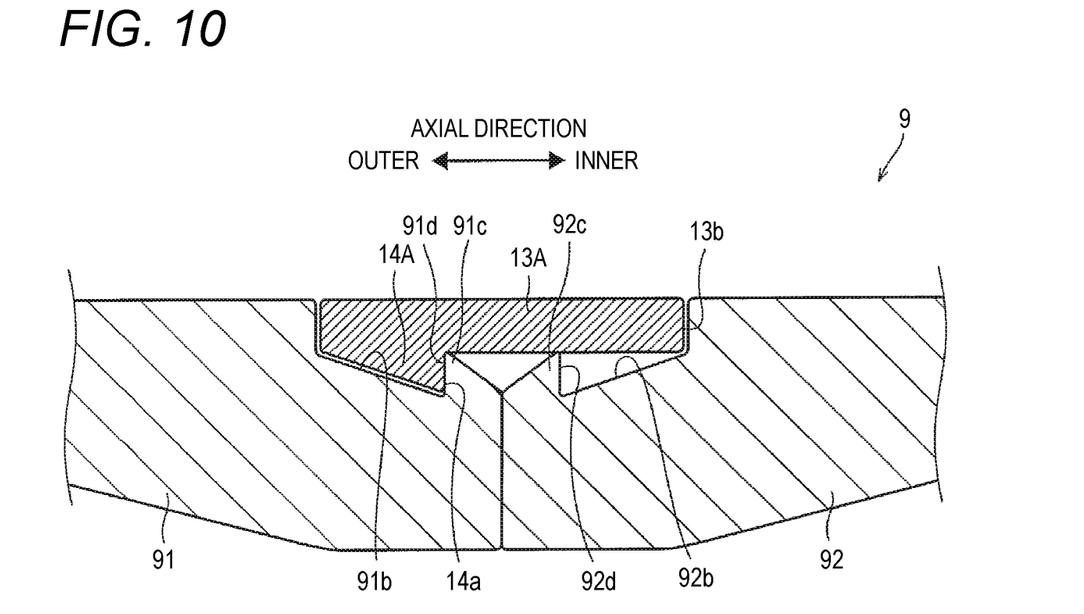
FIG. 10 is a cross-sectional view illustrating part of an outer ring and a connection ring of the second embodiment.
Figure 11:
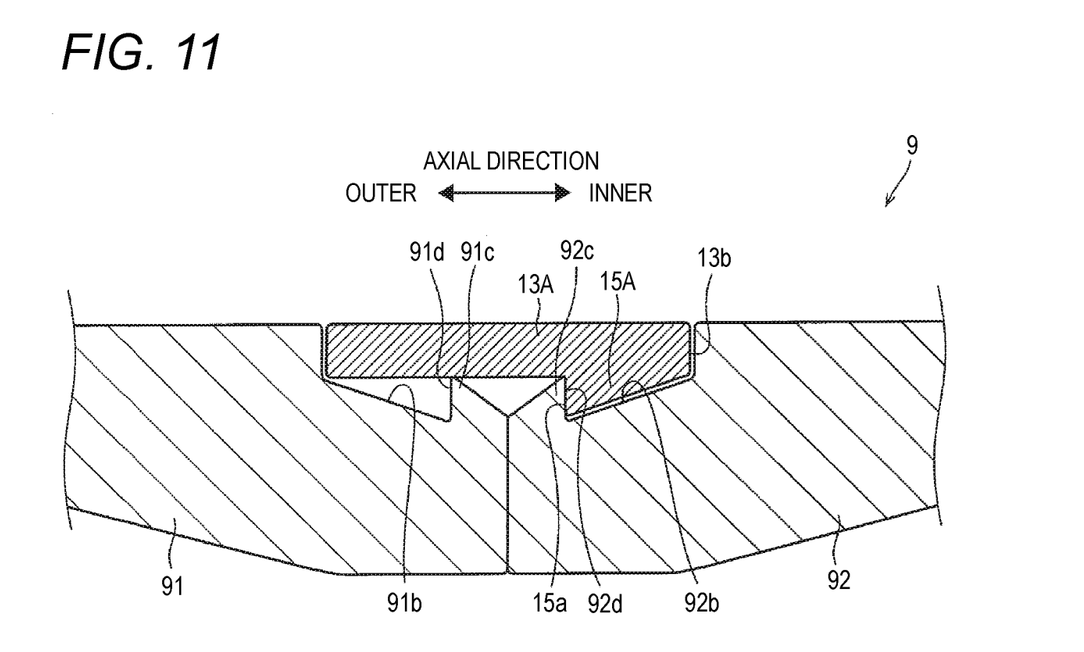
FIG. 11 is a cross-sectional view illustrating part of the outer ring and the connection ring of the second embodiment.

FIGS. 10 and 11 are cross-sectional views illustrating part of the outer ring 9 and the connection ring 13A. FIG. 10 illustrates a cross section of a portion where the claw 14A is formed in the connection ring 13A. FIG. 11 illustrates a cross section of a portion where the claw 15A is formed in the connection ring 13A.

Similarly to the first embodiment, the annular groove 91b is formed in the circumferential direction near a portion abutting on the second outer ring member 92 in the outer circumferential surface of the first outer ring member 91. In the first outer ring member 91, a portion close the center in the axial direction from the groove 91b is called a convex portion 91c. A surface facing in a direction opposite the second outer ring member 92 in the convex portion 91c is formed by the surface 91d.

In the outer circumferential surface of the second outer ring member 92, there is formed an annular groove 92b in the circumferential direction near the portion abutting on the first outer ring member 91. A portion near the center in the axial direction from the groove 92b in the second outer ring member 92 is called the convex portion 92c. The surface facing in a direction opposite the first outer ring member 91 in the convex portion 92c is formed by the surface 91d.

In a state where the first outer ring member 91, the second outer ring member 92, and the connection ring 13A are fitted, the claw 14A is fitted to the groove 91b in a portion where the connection ring 13A includes the claw 14A as illustrated in FIG. 10. At this time, the surface 14a of the claw 14A abuts on the surface 91d of the convex portion 91c of the first outer ring member 91. On the other hand, the claw 15A is fitted to the groove 92b in a portion where the connection ring 13A includes the claw 15A as illustrated in FIG. 11. At this time, the surface 15a of the claw 15A abuts on the surface 92d of the convex portion 92c of the second outer ring member 92. With this configuration, a relative movement between the first outer ring member 91 and the second outer ring member 92 in the axial direction is restricted.

The connection ring 13A of this embodiment can be attached to the first outer ring member 91 and the second outer ring member 92 by the work of the first embodiment.

(Effects of Second Embodiment)

According to the second embodiment, the effects similar to the first embodiment are achieved. According to the second embodiment, the claw 14A and the claw 15A of the connection ring 13A are disposed not to be overlapped in the axial direction. Therefore, as illustrate in FIG. 9, the connection ring 13A can be manufactured using two molds M1 and M2.

Specifically, the connection ring 13A can be molded by injecting and molding a resin in a space between the mold M1 and the mold M2. After the resin is injected between the mold M1 and the mold M2, the claw 14A and the mold M1 are not engaged in the axial direction, and the claw 15A and the mold M2 are not engaged in the axial direction. Therefore, the mold M1 is moved to the left of FIG. 9 and the mold M2 is moved to the right of FIG. 9, so that two molds M1 and M2 can be removed from the connection ring 13A.

In other words, after the resin is injected and molded, the claw 14A and the mold M1 are not engaged in the axial direction, and the claw 15A and the mold M2 are not engaged in the axial direction. Therefore, the connection ring 13A can be molded without using the slide mold. Since the connection ring 13A is molded without using the slide mold, it is possible to prevent an increase of a manufacturing cost of the connection ring 13A.

Since the connection ring 13A can be obtained using the molds M1 and M2 illustrated in FIG. 9, there is no need to perform an additional process to remove the resin between the claw 14 and the claw 15. Therefore, a yield of the connection ring 13A is improved.

<Modifications>
(First Modification)

Figure 12:
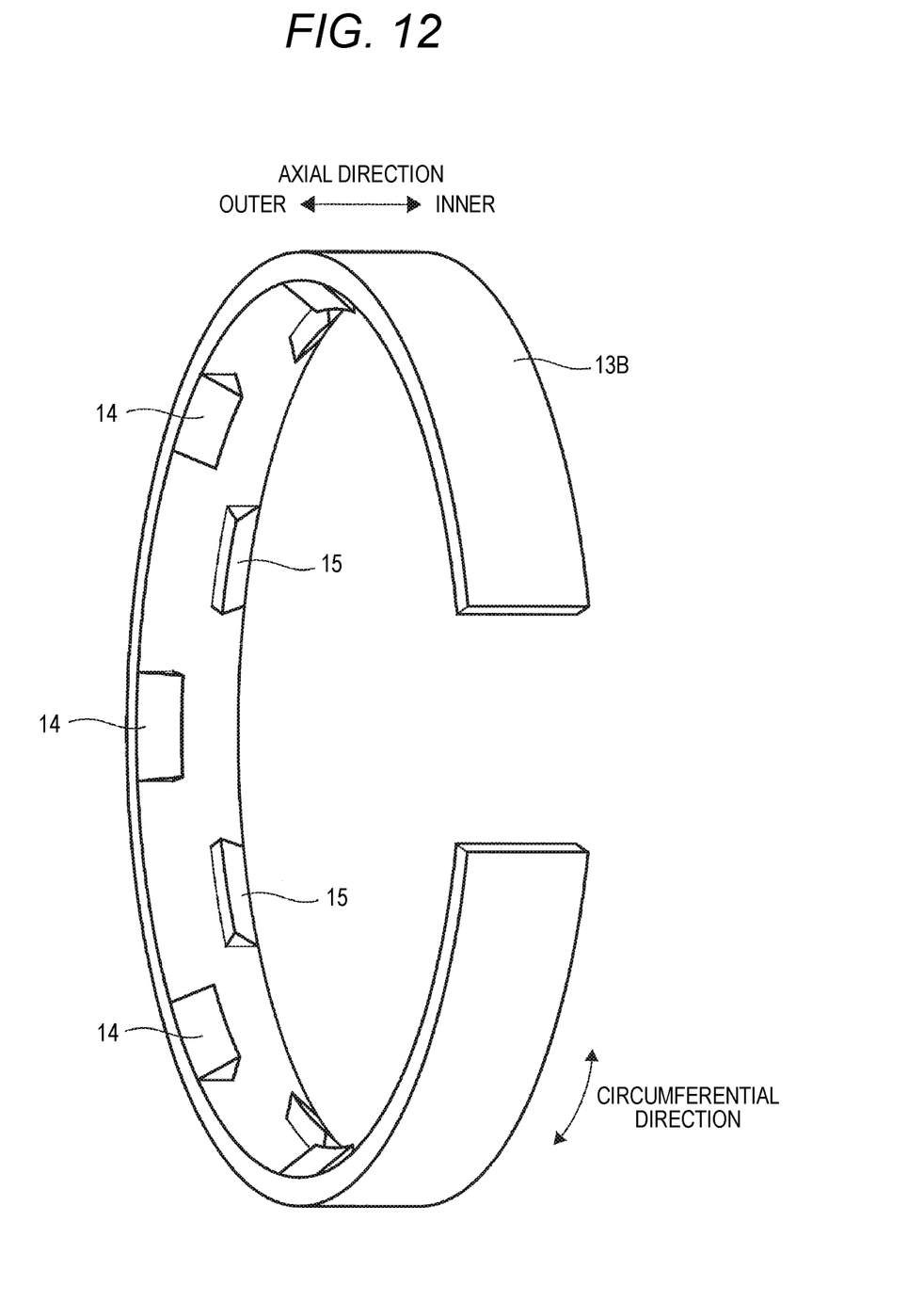
FIG. 12 is a perspective view of a connection ring according to a first modification.

In the first and second embodiments, the connection rings 13 and 13A have been described to be configured in an endless annular shape, but the invention is not limited thereto. For example, part of a connection ring 13B may be formed open as illustrated in FIG. 12.

(Second Modification)

In the above embodiment, the description has been given using FIG. 4 about that the connection ring 13 is stably attached to the first outer ring member 91 in a case where a total sum of magnitudes (°) of the angles θ of the claws 14 is 5% or more with respect to the entire periphery (360°). However, even in a case where a total sum of magnitudes (°) of the angles θ of the claws 14 is less than 5% with respect to the entire periphery (360°), it is possible to obtain an excellent stability when the connection ring 13 is attached to the first outer ring member 91.

Figure 13:
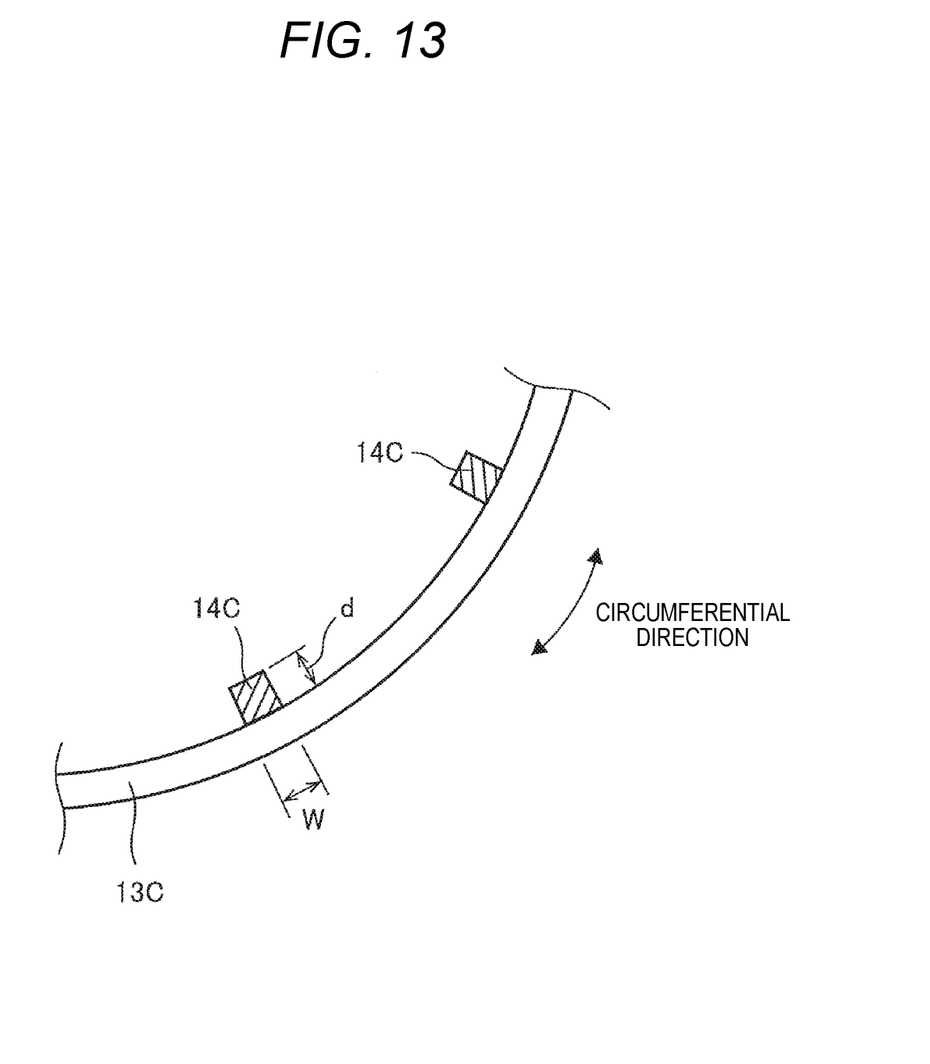
FIG. 13 is a top view illustrating part of a connection ring according to a second modification.

FIG. 13 illustrates part of a connection ring 13C of a second modification. FIG. 13 is a top view of the connection ring 13C when viewed from the axial direction. For convenience sake, a claw 14C is hatched. In the connection ring 13C, a total sum of magnitudes (°) of the angles θ of the claws 14C is less than 5% with respect to the entire periphery (360°).

Less than 5% of the total sum of magnitudes (°) of the angles θ of each of the claws 14C means that the width W in the circumferential direction of the claw 14C is small, or that the number of claws 14C is less. In that case, there is a concern that the stability when the connection ring 13 is attached to the first outer ring member 91 is lowered compared to a case where a total sum of magnitudes (°) of the angles θ of the claws 14C is 5% or more. However, by enlarging the magnitude (the magnitude indicated by d in FIG. 13) of the claw 14C in the radial direction, the hatched area of FIG. 13 is secured largely. Therefore, it is possible to obtain an excellent stability when the connection ring 13C is attached to the first outer ring member 91.

In the first and second embodiments, the bottom 11a near the center portion in the axial direction in the rolling element 11 has been described to be disposed to be close to the axial center L1 in the radial direction compared to the bottom 11b near the both ends in the axial direction, but the invention is not limited thereto. The bottom 11a near the center portion in the axial direction in the rolling element 11 may be disposed to be away from the axial center L1 in the radial direction compared to the bottom 11b near the both ends in the axial direction.

In the first and second embodiments, the outer side of the hub unit 100 has been described as the first outer ring member 91, and the inner side as the second outer ring member 92 in the first outer ring member 91 and the second outer ring member 92, but the structure may be inversed.

In the first and second embodiments, the description has been given about the tapered roller bearing 3. According to the bearing device in which the rolling elements are disposed in double rows, the invention may be applied even to other types of bearing devices. For example, the invention may be applied to a bearing device of which the rolling element is a ball rolling element.

Hitherto, the embodiments described above are described as merely exemplary for carrying out the invention. Therefore, the invention is not limited to the above-described embodiments. The embodiments may be implemented in various forms within a scope not departing from the spirit thereof.

Priority is claimed on Japanese Patent Application (No. 2015-221125) filed on Nov. 11, 2015, and the content of which is incorporated herein by reference.

REFERENCE SIGNS LIST

3: tapered roller bearing (bearing device)
9: outer ring
91: first outer ring member
91a: raceway surface
91b: groove (first groove)
92: second outer ring member
92a: raceway surface
92b: groove (second groove)
10: inner ring
10a: raceway surface
11: a plurality of rolling elements
13: connection ring
14: claw (first claw)
15: claw (second claw)

The invention claimed is:

1. A bearing device comprising:
a first outer ring member and a second outer ring member which include a raceway surface in each inner circumferential surface and are disposed to abut on each other in an axial direction;
a connection ring which fixes the first outer ring member and the second outer ring member to each other;
an inner ring in which two rows of raceway surfaces are formed in an outer circumferential surface; and
a plurality of rolling elements which are disposed in a space formed between the raceway surface of the first outer ring member and one of the two rows of the raceway surfaces of the inner ring, and in a space formed between the raceway surface of the second outer ring member and the other one of the two rows of the raceway surfaces of the inner ring, wherein
the first outer ring member includes a first groove extending in a circumferential direction in an outer circumferential surface,
the second outer ring member includes a second groove extending in the circumferential direction in an outer circumferential surface,
the connection ring includes a plurality of first claws which extrude toward the first groove and are disposed to be separated from each other in the circumferential direction, and a plurality of second claws which extrude toward the second groove and are disposed to be separated from each other in the circumferential direction, the plurality of first claws are engaged with the first groove, and the plurality of second claws are engaged with the second groove, so that the first outer ring member and the second outer ring member are fixed to each other, the connection ring is made of resin, when viewed from the axial direction, the plurality of first claws and the plurality of second claws are respectively disposed so that a first claw of the plurality of first claws and a second claw of the plurality of second claws that is adjacent to the first claw are spaced from each other in the circumferential direction, and in the connection ring, the plurality of first claws and the plurality of second claws are disposed not to be overlapped when viewed from the axial direction.

2. The bearing device according to claim 1, wherein each of the plurality of first claws and the plurality of second claws is formed by three or more.

* * * * *